March 17, 1925.
C. PERRINE
BABY WALKER
Filed July 25, 1924
1,530,405
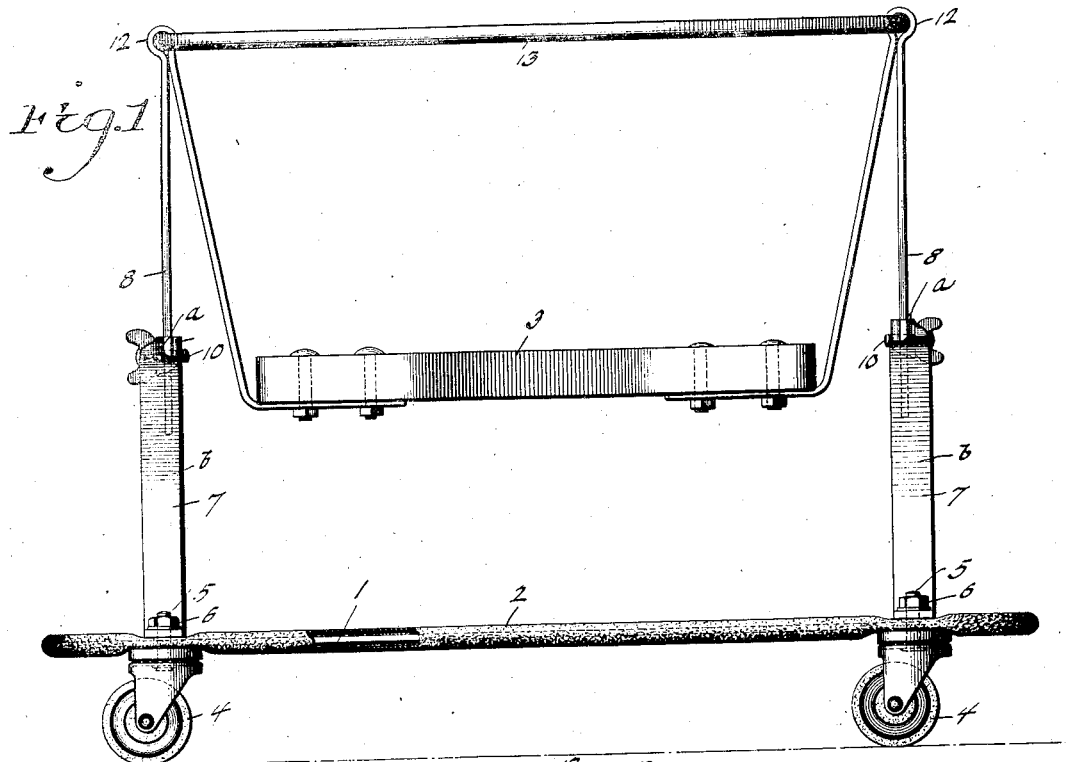
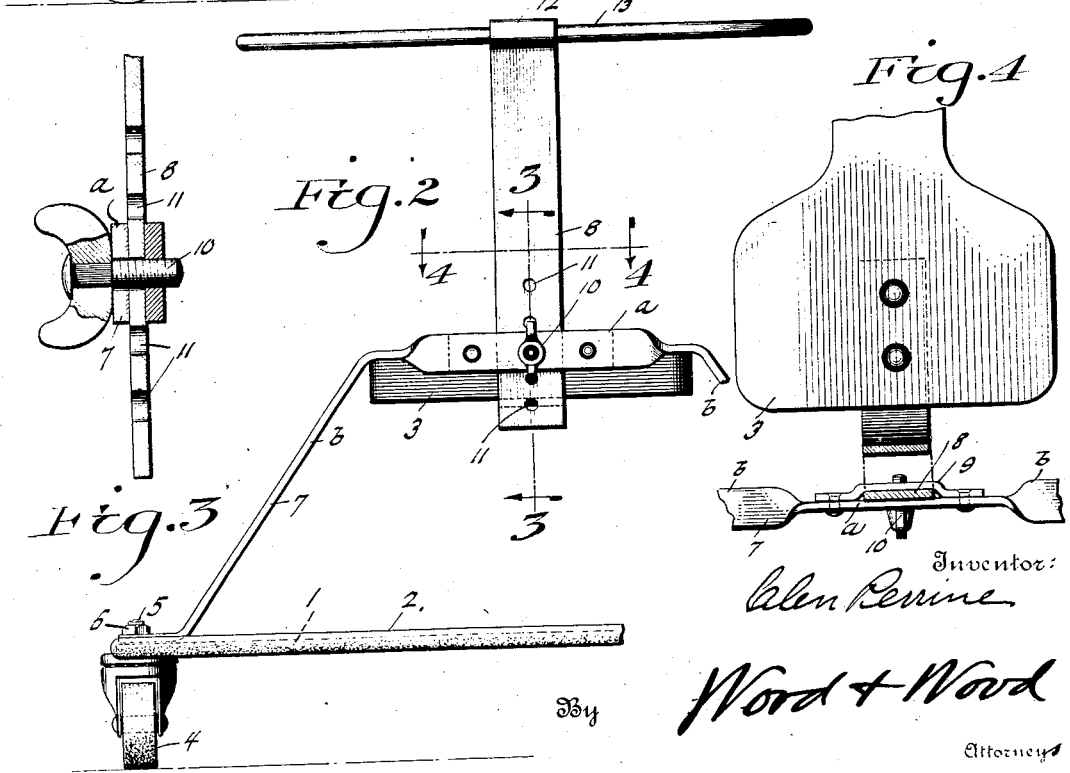

Patented Mar. 17, 1925.

1,530,405

UNITED STATES PATENT OFFICE.

CLEN PERRINE, OF WYOMING, OHIO, ASSIGNOR TO THE JOHN A. HUTH COMPANY, OF CINCINNATI, OHIO, A CORPORATION OF OHIO.

BABY WALKER.

Application filed July 25, 1924. Serial No. 728,267.

*To all whom it may concern:*

Be it known that I, CLEN PERRINE, a citizen of the United States, and residing at Wyoming, in the county of Hamilton and State of Ohio, have invented a new and useful Baby Walker, of which the following specification is a full disclosure.

This invention relates to a child's vehicle or perambulator, known to the trade as a baby walker, and comprises a band frame supported upon casters providing a chassis for the vehicle, a pair of oppositely disposed bolsters secured to the band frame, and a saddle adjustably sustained between the bolsters centrally of the band frame. The structure is principally formed of steel, bar steel, bent to form, providing a durable device light in weight and very simple of construction.

An object of the invention is to provide a child's roller vehicle within which the child can be seated astraddle with his feet upon the floor so that he can maneuver himself about in any direction, and in which he is safely confined with ample freedom for the movements of body and limbs, and to provide a low chassis for the vehicle of band form to abound the saddle or seat centrally suspended within the vehicle so that the vehicle is not easily tilted or upset by the propelling movements of the child and which serves as a bumper or guard.

Another object of the invention is to provide a structure in which the suspended saddle or seat can be adjusted to position, the seat to a proper height for the child when seated with the feet upon the floor and in a posture to assist the child to learn to walk and obtain beneficial exercise of its limbs.

Other objects of the invention relating to the details of construction and combination of parts will be hereinafter more fully described and illustrated in the accompanying drawing, showing the preferred embodiment, in which:

Figure 1 is a side elevation of my improved baby walker or roller vehicle.

Figure 2 is an end elevation of the same, with a portion of the carriage frame cut off to accommodate for additional views.

Figure 3 is an enlarged section on line 3—3, of Fig. 2, and

Figure 4 is a section on line 4—4, of Fig. 2.

Referring to the drawing, 1 indicates a band frame of steel bar stock bent into rectangular hoop-like structure with its ends connected, serving as a chassis for the vehicle and bumper on all sides and giving dimension to the vehicle to prevent its being easily tilted or upset. The band is covered with a suitable covering material for cushioning purpose as enclosed within rubber tubing 2, so as not to mar the woodwork or furniture of a room, against which it may strike while being propelled about by the child, who sits astraddle of the seat 3 with its feet upon the ground or floor, and within the enclosure offered by the frame 1, which however is of such size as to give absolute freedom to the limbs of the child in its maneuvering of the vehicle. The frame is supported upon casters 4, preferably four in number, and at relatively right angle locations to properly sustain the vehicle and to render the same readily mobile. In this capacity the casters are preferably of ball bearing type with the spindle 5 on each of the casters engaged through the band frame 1 and through a respective end of a bolster which supports the seat 3, and secured by a nut 6 threaded upon the end of the spindle. A pair of bolsters 7 of duplicate construction are provided, each of bar stock bent into a bridge or yoke form, to span across the band frame 1 and appropriately spaced for supporting the seat 3 therebetween and beyond any interference with the free movement of the limbs of the child straddling the seat. At the intermediate or cross-bar portion $a$ of the bolster, the bar is twisted to present its sides in a vertical plane, and at an angle to the strut or limb portions $b$, the limb portions inclining outwardly from the intermediate or cross-bar portion, with the extremities of the limbs bent to a horizontal plane for attachment with the frame 1. The bolsters may be inclined slightly toward each other to give the structure increased rigidity. Each bolster carries a standard 8 which is detachably engaged between the cross-bar portion $a$ and a strap 9 secured to the cross-bar portion $a$ by bolts or rivets. The standard is secured to the bolster by a thumb screw 10 engaged through the cross-bar, and standard and threaded into the strap 9. The standard is provided with a series or row of holes 11 adapting the standard to be vertically adjusted for changing the height of the seat from the floor, and at its upper end is formed into a loop 12 to receive and support a girdle ring 13. From the loop the standard extends downwardly and thence laterally to provide a horizontal foot portion to which the seat or saddle board 3 is secured. The saddle board is of an outline to provide a narrow intermediate part as a saddle bar which is straddled by the child, and connects the opposite larger end portions each of which can be alternately used as a seat, so that there is no definite front or rear designation to the vehicle. The child can be seated to face in either of the opposite directions. This aside from its utility advantages, standardizes and minimizes the number of different parts making up the vehicle, reducing the manufacturing costs and facilitating the assembly. It also enables the use of rod or bar stock which is easily formed into shape, very light in weight, strong and durable. The saddle board is centered within the chassis balancing the vehicle so that it is not easily tilted or upset, and the construction of the bridge and standard member offers a degree of resiliency to cushion the seat and check heavy impacts from being transmitted to the rider which may cause injury to the child, when the vehicle is forcibly rolled against any obstruction.

The girdle ring is of heavy wire secured at its ends and may be either loosely or permanently fixed within the loops of the standard and is of a height from the seat to provide arm support or be gripped by the hands of the child in propelling itself about and also serves as a guard to confine the child within the vehicle, although leaving the child free to maneuver as it wishes. The ring may also be covered with a rubber tubing. The swiveling ball bearing caster enables steering the vehicle in any direction and provides for a low wheel base which also stabilizes the vehicle.

The standards, saddle seat and rings are combined as a unit, removable from the bolsters or adjusted downwardly to compactly bring the vehicle parts together for packing into a container; this is of advantage in shipping as it avoids loss of parts and to the dealer in reducing his assembly costs and labor. It also permits the shipping in smaller and less expensive cartons.

Having described my invention, I claim:

1. In a vehicle of the class described, a base frame of band form having rollers mounted thereon to provide a wheeled base, a pair of bolsters secured to and spanning across the base frame at relatively opposite ends thereof, a saddle seat disposed between said bolsters, return bend standards, each return bend standard providing a link secured to the saddle seat and a second link to a respective bolster, for suspendingly supporting the seat between the bolsters.

2. In a vehicle of the class described, a base frame of band form having rollers mounted thereon to provide a wheeled base, a pair of bolsters secured to and spanning across the base frame at relatively opposite ends thereof, a saddle seat disposed between said bolsters, return bend standards, each return bend standard providing a link secured to the saddle seat and a second link to a respective bolster, for suspendingly supporting the seat between the bolsters, and a ring secured to said standard, above the seat for encircling the body of the occupant of the seat.

3. In a vehicle of the class described, a roller carrying base frame of band form, bolsters connected to and bridging the base frame at relatively opposite ends thereof, standard members vertically adjustable, secured to said bolsters respectively, for dependingly sustaining a saddle seat board to and between said bolsters, a saddle seat board secured at its opposite ends respectively to said standard members, the standard members extending above the plane of the seat, and a ring secured to the standards above the seat.

In witness whereof, I hereunto subscribe my name.

CLEN PERRINE.